(12) United States Patent
Harwood et al.

(10) Patent No.: US 12,629,758 B1
(45) Date of Patent: May 19, 2026

(54) QUICK ATTACH SAW TOOTH

(71) Applicant: Deere & Company, Moline, IL (US)

(72) Inventors: Adam G Harwood, Dubuque, IA (US);
Justin T. Benson, Dubuque, IA (US);
Zachary Toman, Dubuque, IA (US);
Clint R. Auderer, Holy Cross, IA
(US); Tyler G. Kelsch, Sherrill, IA
(US)

(73) Assignee: Deere & Company, Moline, IL (US)

( * ) Notice: Subject to any disclaimer, the term of this
patent is extended or adjusted under 35
U.S.C. 154(b) by 0 days.

(21) Appl. No.: 19/184,022

(22) Filed: Apr. 21, 2025

(51) Int. Cl.
*B23D 65/00* (2006.01)
*A01G 23/091* (2006.01)

(52) U.S. Cl.
CPC ........... *B23D 65/00* (2013.01); *A01G 23/091*
(2013.01)

(58) Field of Classification Search
CPC ...... B23D 65/00; A01G 23/091; A01G 23/08;
A01G 23/081; A01G 3/088; B27G 13/02;
B27G 13/04; B27G 13/08; B27G 13/10;
B27B 7/00
USPC .......................................................... 83/835
See application file for complete search history.

(56) References Cited

U.S. PATENT DOCUMENTS

| | | | |
|---|---|---|---|
| 5,377,731 A | 1/1995 | Wildey | |
| 7,992,604 B1 * | 8/2011 | Suor | B27B 7/00 |
| | | | 144/237 |
| 8,206,055 B2 * | 6/2012 | Schafer | F16D 1/06 |
| | | | 403/359.5 |
| 9,137,954 B2 * | 9/2015 | Leonardi | B27G 13/10 |
| 10,779,483 B2 | 9/2020 | Bindl | |
| 2007/0151430 A1 * | 7/2007 | Maclennan | B28D 1/122 |
| | | | 83/13 |
| 2007/0277656 A1 * | 12/2007 | Zeiler | B23B 51/0473 |
| | | | 83/13 |
| 2014/0069553 A1 * | 3/2014 | Disabatino | A01G 23/081 |
| | | | 144/4.1 |
| 2021/0105950 A1 * | 4/2021 | Luttmer | A01G 3/088 |
| 2023/0347545 A1 * | 11/2023 | Zogg | B27B 5/32 |

OTHER PUBLICATIONS

Quadco Cutting Tools—Saw Disc Guide (1 page)(undated but
admitted to be prior art).

* cited by examiner

*Primary Examiner* — Sarang Afzali
*Assistant Examiner* — Darrell C Ford
(74) *Attorney, Agent, or Firm* — Lucian Wayne Beavers;
Patterson Intellectual Property Law, PC

(57) ABSTRACT

A cutting assembly includes a receiver, a mounting shaft, a
tooth and a biasing spring. The components are configured
such that the tooth may be removed and replaced by manual
operation without the use of any tools. The mounting shaft
carries a key that is received in a J-slot formed in the tooth.
In an installed position the biasing spring holds the key in a
blind passage of the J-slot to hold the tooth in place on the
receiver. Manual manipulation of the mounting shaft allows
the tooth to be released and removed.

8 Claims, 10 Drawing Sheets

QUICK ATTACH SAW TOOTH

FIELD OF THE DISCLOSURE

The present disclosure relates generally to a quick attach tooth assembly for use with a disk saw felling head or similar cutting tool.

BACKGROUND OF THE DISCLOSURE

Cutting assemblies such as those associated with a disk saw felling head, a rotary mulcher, or other such tools, typically use replaceable cutting teeth that are held in place by a threaded bolt. Removal and replacement of worn teeth is a time consuming process requiring the use of tools to engage and remove the bolts holding the teeth in place on a receiver structure. There is a need for improvements in the mounting of such cutting assemblies.

SUMMARY OF THE DISCLOSURE

According to an aspect of the present disclosure, a cutting assembly includes a receiver, a mounting shaft, a tooth and a biasing spring. The receiver may include at least one tooth mounting location defined on the receiver, each tooth mounting location including a receiver mounting passage disposed through the receiver, the receiver mounting passage having a longitudinal axis defining a first direction and an opposite second direction along the longitudinal axis, and each tooth mounting location including a tooth supporting surface facing at least partially in the first direction and a spring supporting surface facing at least partially in the second direction. The mounting shaft may include a tooth mounting end and an actuating end, the tooth mounting end including a key protruding laterally relative to a longitudinal axis of the mounting shaft, the mounting shaft being configured to be received through the receiver mounting passage. The tooth may be configured to be supported on the tooth supporting surface of the receiver, the tooth including at least one cutting surface, the tooth including a shank including a tooth mounting passage defined therethrough, the tooth mounting passage including an insertion path configured such that the key of the tooth mounting end of the mounting shaft may pass through the insertion path, and the tooth mounting passage including a blind return passage rotationally offset from the insertion path about a longitudinal axis of the tooth mounting passage, the blind return passage being configured to block retraction of the mounting shaft from the tooth mounting passage in the second direction when the key is aligned with the blind return passage. The biasing spring may be configured to be received around the mounting shaft and to engage the spring supporting surface of the receiver, the biasing spring biasing the mounting shaft in the second direction when the mounting shaft, the tooth and the biasing spring are assembled together on the receiver.

In another aspect of the disclosure a quick attach tooth for a rotatable cutting member includes a four sided body having a flat bottom defining a tooth support surface, the body including at least one cutting surface spaced in a first direction from the flat bottom. A shank extends from the flat bottom in a second direction opposite the first direction, the shank including a tooth mounting passage defined therethrough, the tooth mounting passage including an insertion path being open in both the first and second directions, and the tooth mounting passage including a blind return path rotationally offset from the insertion path about a longitudinal axis of the tooth mounting passage, the blind return passage being open in the first direction and closed in the second direction.

And in a further aspect of the disclosure a method is provided of installing a quick attach tooth assembly on a receiver, the receiver including a receiver mounting passage disposed through the receiver. The method may include steps of: assembling a mounting shaft including a tooth mounting end and an actuating end with a biasing spring received around the mounting shaft, one end of the biasing spring being stopped from movement toward the actuating end by a spring stop extending radially outward from the mounting shaft, the tooth mounting end of the mounting shaft including a key extending radially outward from the mounting shaft; inserting the tooth mounting end of the mounting shaft into the receiver mounting passage of the receiver so that the actuating end of the mounting shaft still protrudes out of the receiver mounting passage; fitting a retaining plate over the actuating end of the mounting shaft so that the actuating end of the mounting shaft protrudes through an opening of the retaining plate; attaching the retaining plate to the receiver to hold the mounting shaft and biasing spring within the receiver mounting passage; inserting a shank of a quick attach tooth into an end of the receiver mounting passage opposite from the actuating end of the mounting shaft, the shank having a tooth mounting passage defined therethrough, the tooth mounting passage including an insertion path and a blind return path; aligning the key of the tooth mounting end of the mounting shaft with the insertion path of the tooth; inserting the key through the insertion path; rotating the mounting shaft relative to the tooth so that the key is aligned with the blind return path; and releasing the mounting shaft so that the biasing spring retracts the mounting shaft so that the key engages a blind end of the blind return path thereby holding the tooth in place against a tooth supporting surface of the receiver.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
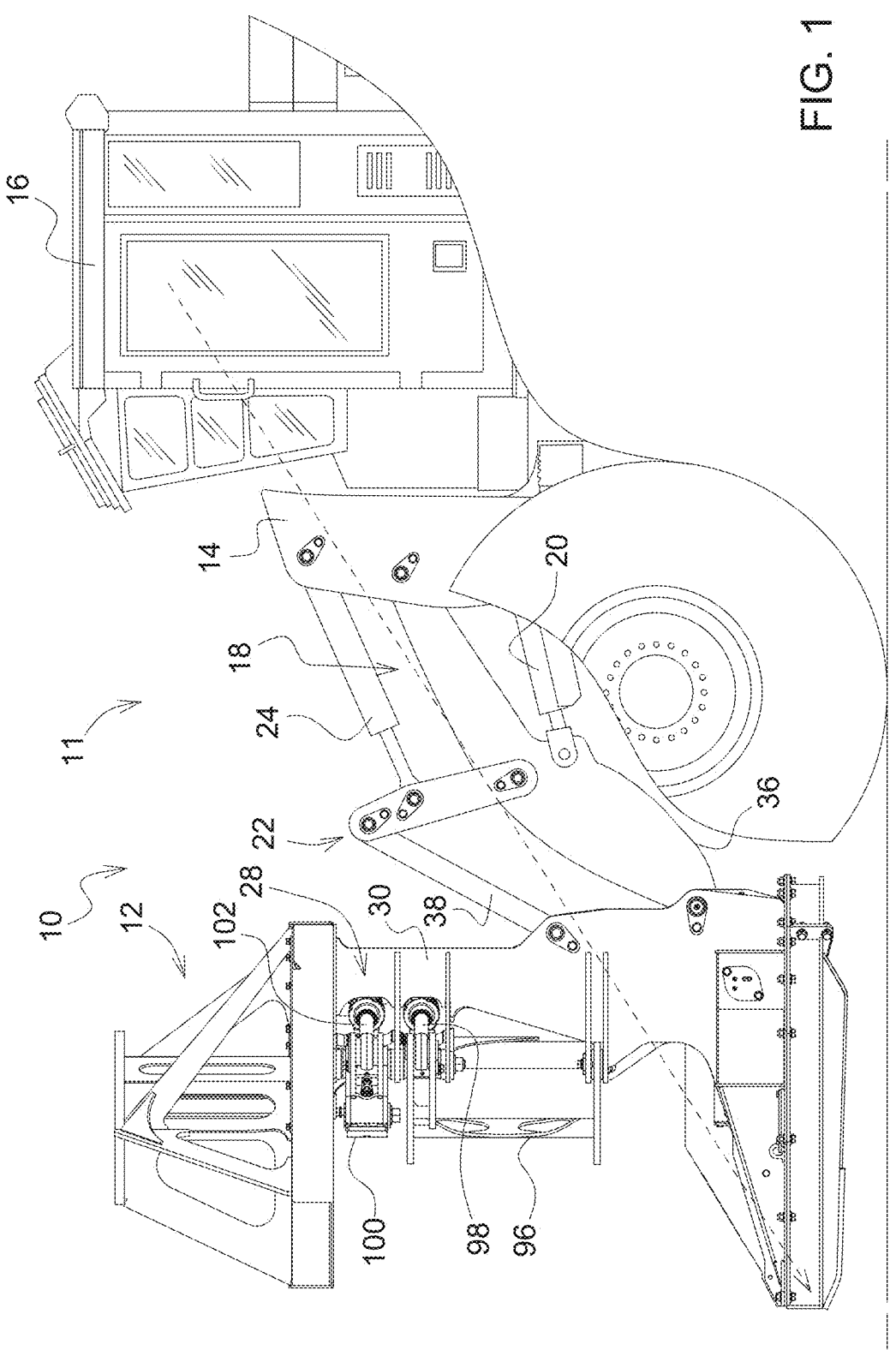
FIG. 1 is a side elevation view showing a simplified forestry vehicle including a base machine and a disk saw felling head attached to the base machine for manipulation thereby.

Referring to FIG. 1, there is shown a forestry vehicle 10 including a base machine 11 (e.g. wheeled base machine, tracked base machine, or some other ground supporting means) and a disk saw felling head 12 attached to the base machine 11 to be manipulated and controlled thereby. The disk saw felling head 12 is configured to fell a tree(s) and to accumulate them for subsequent collective deposition.

The base machine has a front frame 14, a rear frame (not shown), and an operator's station 16, a boom 18, a pair of hydraulic lift cylinders 20 (left and right, the left shown and representative of the right), a pivot linkage 22, and a pair of hydraulic pivot cylinders 24 (left and right, the left shown and representative of the right). The front frame 14 and the rear frame are articulated to one another for relative pivotable movement therebetween about an articulation axis. The operator's station 16 is mounted to the rear frame. The boom 18 is attached pivotally to the front frame 14, and the head 12 is attached pivotally to the boom. The lift cylinders 20 are attached to the front frame 14 and the boom 18 to raise and lower the boom 18, and thus the head 12, relative to the front frame 14. The pivot linkage 22 is attached pivotally to the boom 18 and the head 12. The pivot cylinders 24 are attached to the boom 18 and the linkage 22 to pivot the linkage 22, and thus the head 12, forwardly and rearwardly relative to the boom 18.

Figure 2:
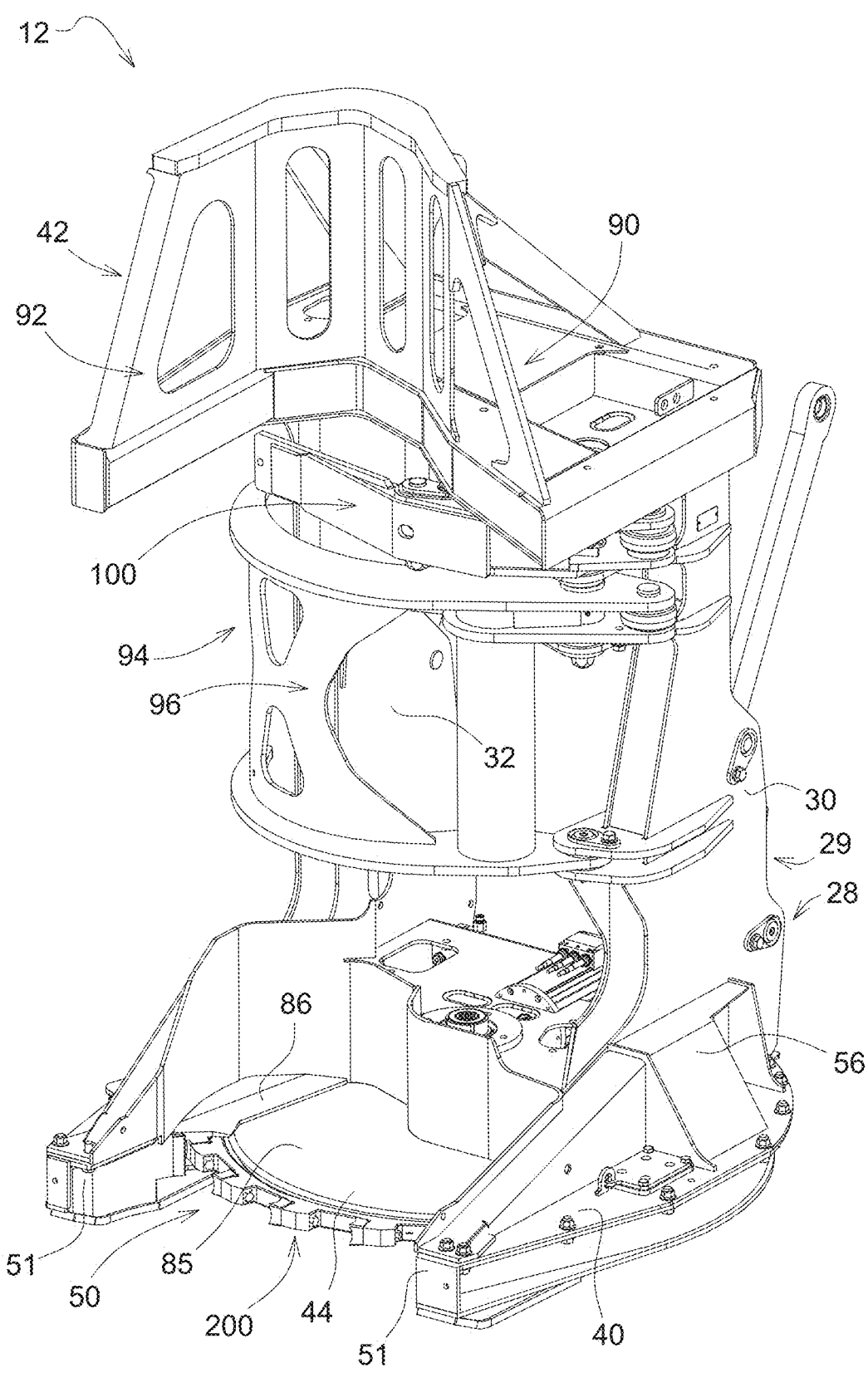
FIG. 2 is a perspective view of the disk saw felling head of FIG. 1.

Referring to FIG. 2, the head 12 includes a frame 28. The frame 28 includes a spine 29, which includes a left or first mounting post 30 and a right or second mounting post 32. The first and second mounting posts (30, 32) are configured for attaching the head 12 to the base machine 11 and are spaced laterally apart from one another. The spine 29 and its mounting post 30, 32 extend longitudinally in the vertical dimension.

Referring to FIG. 1, the boom 18 includes a left or first boom arm 36 and a right or second boom arm 36. The first boom arm 36 is shown and representative of the second boom arm 36. The first boom arm 36 and the second boom arm 36 are attached pivotally to the front frame 14 and attached pivotally respectively to the first mounting post 30 and the second mounting post 32. The lift cylinders 20 are attached respectively to the boom arms 36.

The pivot linkage 22 includes a left or first link 38 and a right or second link 38, the first link 38 shown and respresentative of the second link 38. The first link 38 and the second link 38 are attached pivotally, respectively to the first mounting post 30 and the second mounting post 32.

The head 12 includes a saw-and-motor section 40 and a horn section 42. The saw-and-motor section 40 is attached to a lower portion of the spine 29. The horn section 42 is attached to an upper portion of the spine 29 above the lower portion relative to the vertical dimension of the head 12.

In the saw-and-motor section 40, the head includes a disk saw 44 configured for felling trees. The disk saw 44 is attached rotatably to, and positioned largely within, a saw housing 56 of the frame 28 so as to be housed within the frame 28 and has cutting teeth assemblies 200 spaced around it periphery for cutting through a tree. The disk saw 44 is partially exposed outside the saw housing 56, and thus the frame 28, in a cutting zone of the head 12 at a front of the head 12.

The saw housing includes a left or first housing extension 51 and a right or second housing extension 51. The cutting zone 50 is defined as an imaginery vertical column relative to the vertical dimension, the column extending laterally between the housing extensions 51 relative to the lateral dimension 26.

The saw-and-motor section 40 of the head 12, includes a motor operatively coupled to the disk saw 44 to rotationally drive the disk saw 44 about a disk saw axis though a coupling assembly. The motor is preferably either electric or hydraulic.

Now turning to FIG. 2, the frame 28 includes tree-receiving region 85 configured for receiving felled trees once they are felled by the saw 44. The tree-receiving region 85 includes a side accumulation pocket 86 configured for accumulating the felled trees.

In the horn section 42, the frame 28 includes a box platform 90 mounted atop the mounting posts (30, 32) and a horn 92 mounted atop the platform 90. The horn 92 and the box platform 90 are configured so as to facilitate accumulation of felled trees in the pocket 86.

The head 12 includes an arm section 94 positioned between the saw-and-motor section 40 and the horn section 42. In the arm section 94, the head 12 includes a harvesting arm 96, a harvesting cylinder 98, a bunching arm 100, and a bunching cylinder 102.

The harvesting arm 96 is attached pivotally to the frame 28 to pivot relative thereto to move a felled tree into the side accumulation pocket 86. The harvesting cylinder 98 is attached pivotally to the mounting post 32 of the frame 28 and the harvesting arm 96 and is operable to pivot the harvesting arm 96 relative to the frame 28.

The bunching arm 100 is attached pivotally to the frame 28 to pivot relative thereto to hold the felled tree(s) in the pocket 86. The bunching cylinder 102 is attached pivotally to the mounting post 32 of the frame 28 and the bunching arm 100 and is operable to pivot the bunching arm 100 relative to the frame 28.

The present disclosure provides a configuration of the cutting teeth assemblies 200 and a mounting region of the disk saw 44 that allows the cutting teeth to be quickly and easily mounted or removed and replaced from the disk saw 44.

Figure 3:
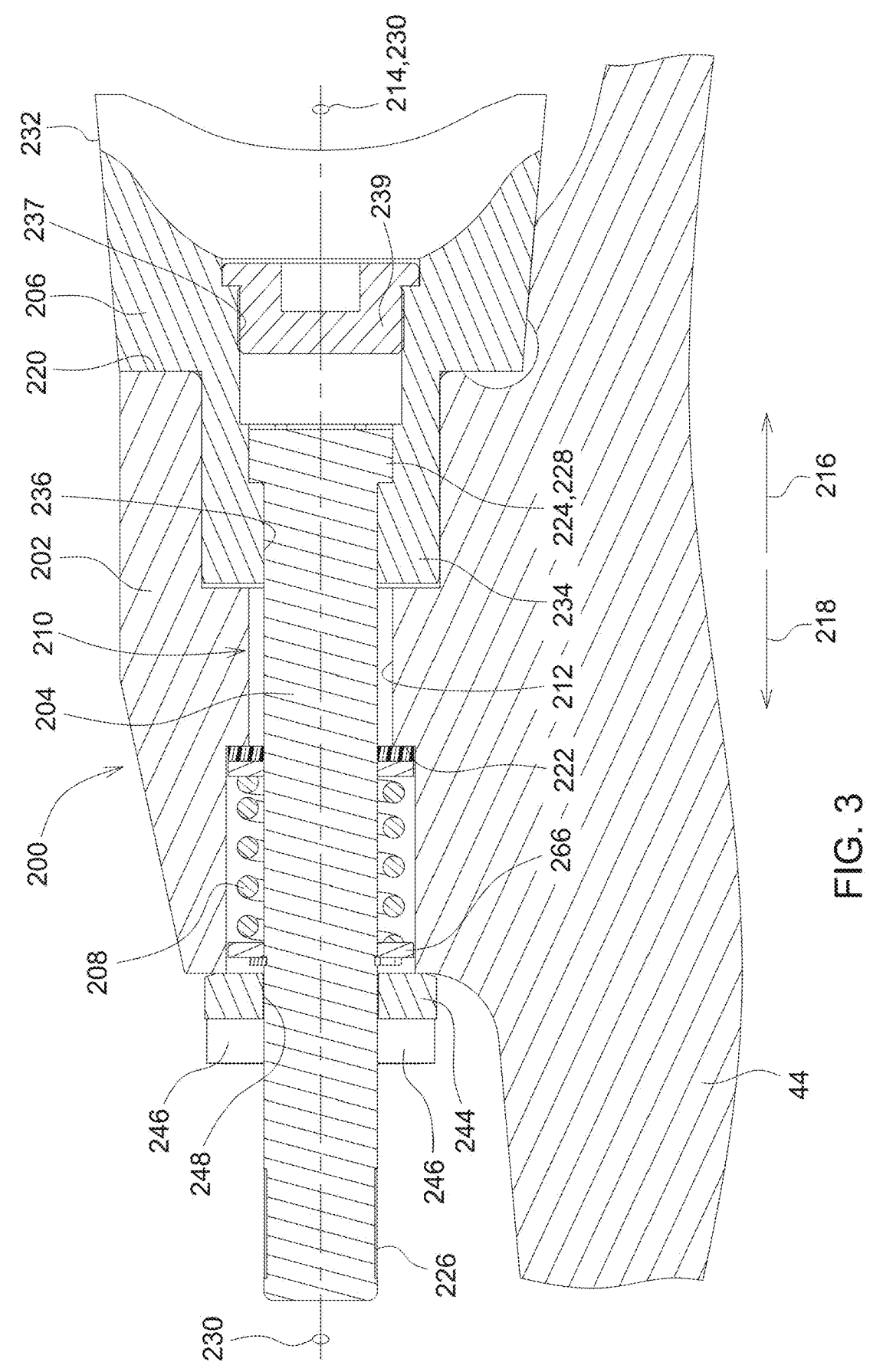
FIG. 3 is a cross-sectional view of a cutting assembly showing one removable cutting tooth mounted on a tooth mounting location of a receiver such as the cutting disk of the felling head.
Figure 4:
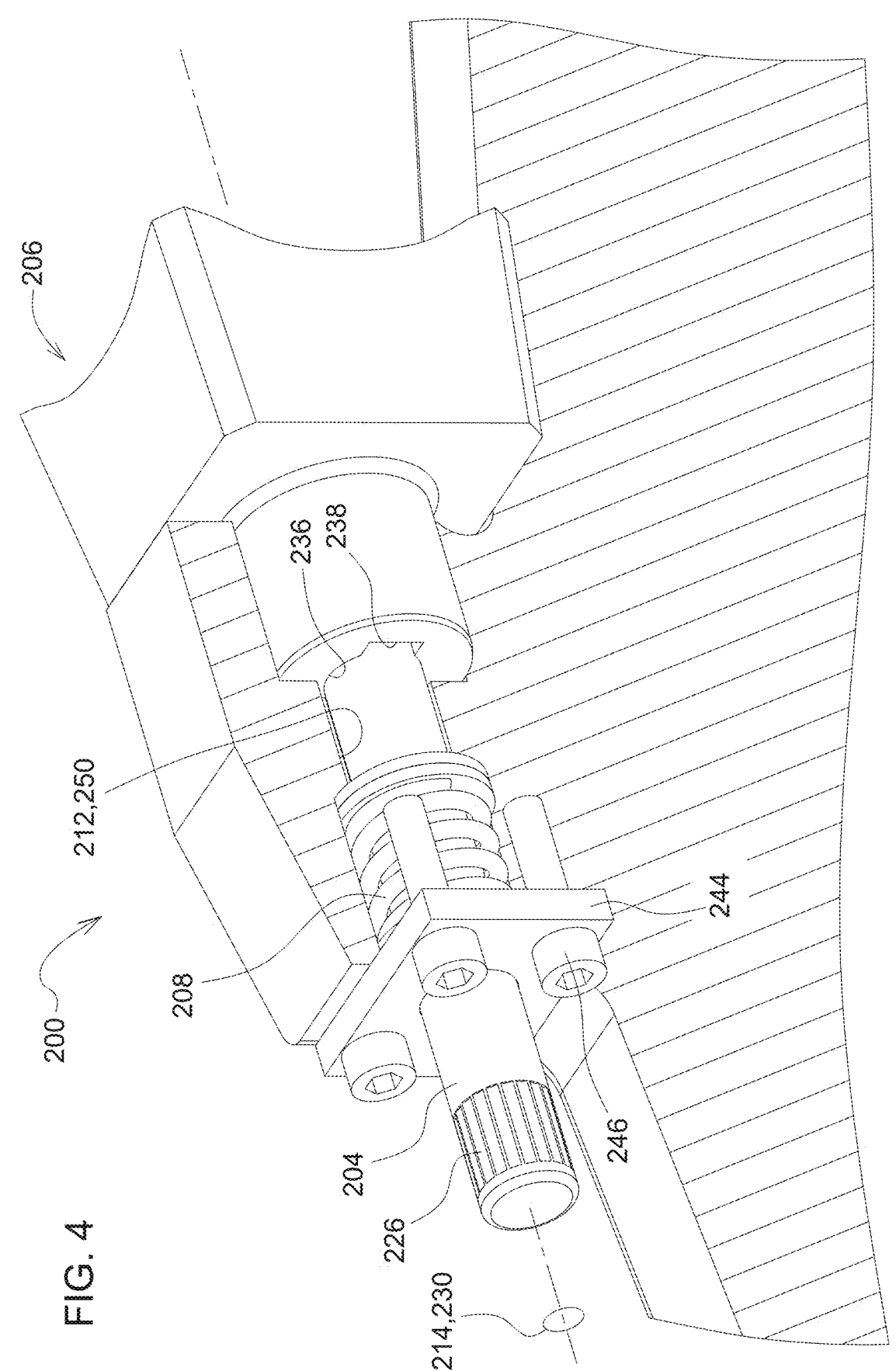
FIG. 4 is a perspective cross-sectional view of the cutting assembly of FIG. 3.

A cutting tooth assembly 200 or simply a cutting assembly 200 is shown in cross-section in FIG. 3 and may include a receiver 202, a mounting shaft 204, a tooth insert or tooth 206 and a biasing spring 208. In the case of the felling head the receiver 202 may be a portion of the disk saw 44. For other forestry implements, such as a mulching drum, the receiver 202 may be a mounting lug on the mulching drum.

The receiver 202 includes at least one tooth mounting location 210 defined on the receiver, each tooth mounting location 210 including a receiver mounting passage 212 disposed through the receiver. The receiver mounting passage has a longitudinal axis 214 defining a first direction 216 and an opposite second direction 218 along or parallel to the longitudinal axis 214. Each 210 tooth mounting location includes a tooth supporting surface 220 facing at least partially in the first direction 216 and a spring supporting surface 222 facing at least partially in the second direction 218.

The mounting shaft 204 includes a tooth mounting end 224 and an actuating end 226, the tooth mounting end 224 including a key 228 protruding laterally relative to a longitudinal axis 230 of the mounting shaft 204. The mounting shaft 204 is configured to be received through the receiver mounting passage 212. The actuating end 226 may be knurled, or splined, or have other surface texturing features to aid in the gripping of the actuating end 226 by the fingers of a human hand grasping and manipulating the mounting shaft 204.

Figure 9:
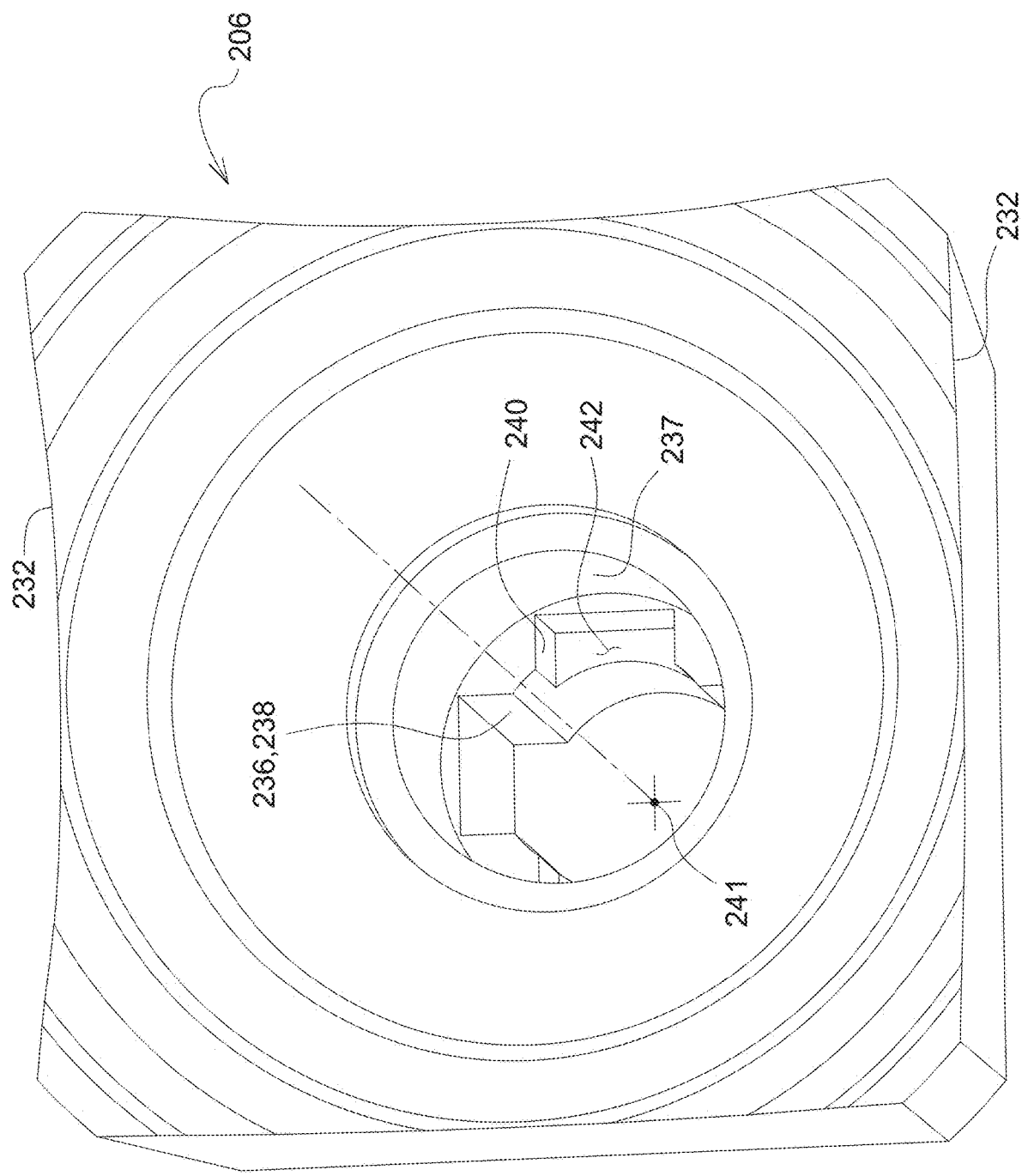
FIG. 9 is a perspective view of the tooth of the cutting assembly of FIG. 3.
Figure 10:
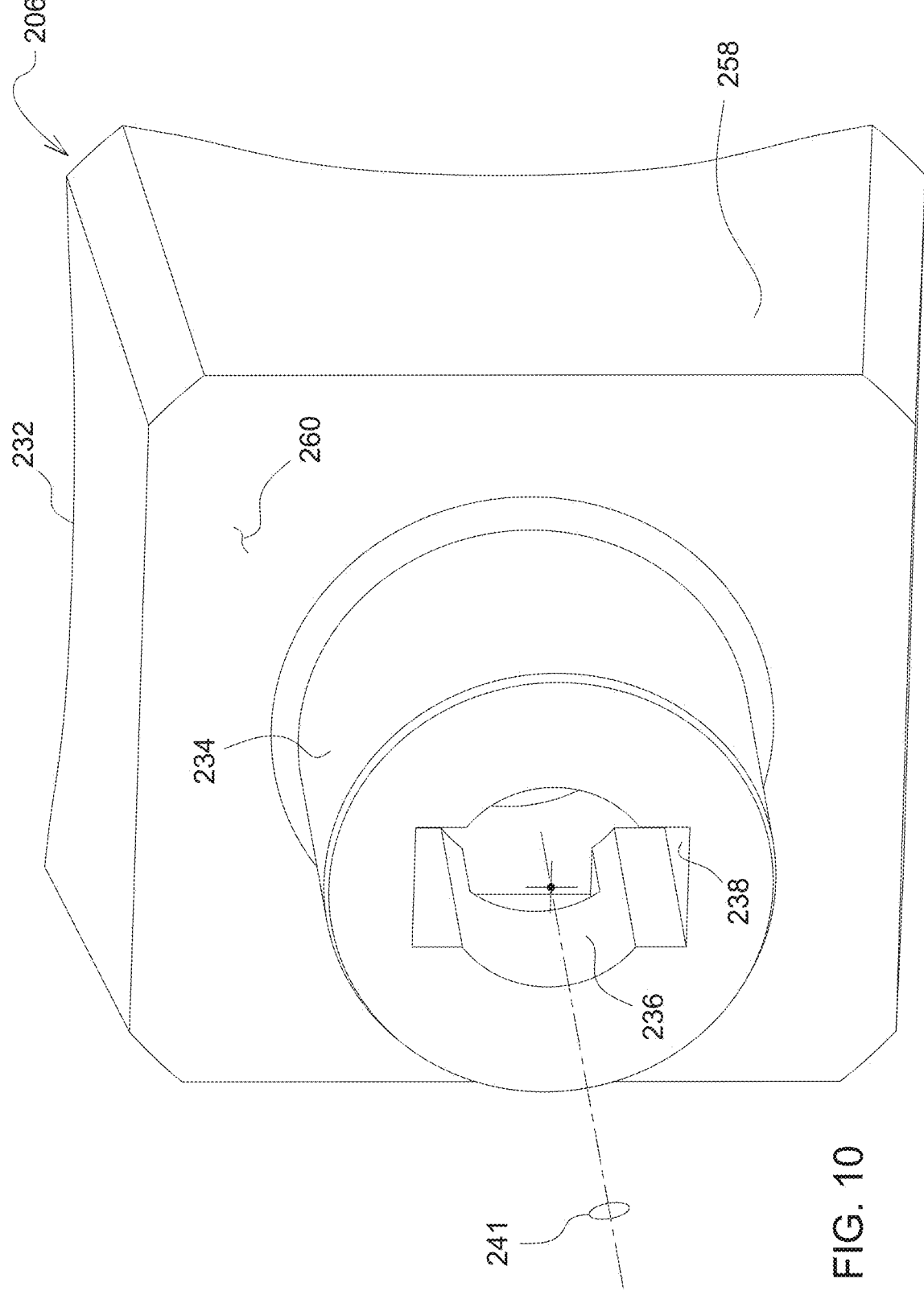
FIG. 10 is another perspective view of the tooth of the cutting assembly of FIG. 3 from a different perspective.

The tooth insert 206, which may also be referred to as tooth 206, is configured to be supported on the tooth supporting surface 220 of the receiver 202. The tooth 206 includes at least one cutting surface 232. A four sided tooth 206 as shown may include multiple cutting surfaces 232 which may be selectively brought into use by reorientation of the tooth 206 relative to the receiver 202. The tooth 206 includes a shank 234 including a tooth mounting passage 236 defined therethrough. The tooth mounting passage 236 includes an insertion path 238 configured such that the key 228 of the tooth mounting end 224 of the mounting shaft 204 may pass through the insertion path 238. The tooth mounting passage 236 further includes a blind return passage 240 (see FIG. 9) rotationally offset from the insertion path 238 about a longitudinal axis 241 of the tooth mounting passage 236. The blind return passage 240 includes a blind end 242 configured to block retraction of the mounting shaft 204 from the tooth mounting passage 236 in the second passage direction 218 when the key 228 is aligned with the blind return passage 240.

The insertion path 238 and the blind return passage 240 of the tooth mounting passage 236 form a J-slot configured such that to release the tooth 206 from the assembly 200 the mounting shaft 204 must move in the first direction 216 relative to the receiver 202 compressing the spring 208, and then the mounting shaft 204 must be rotated about the longitudinal axis 230 to move the key 228 into the insertion path 238 so that the tooth 206 may be removed from the assembly 200 by movement of the tooth 206 in the first direction 216 relative to the receiver 202. The insertion path 238 is open in both the first and second directions 216 and 218, and the blind return passage 240 is open in the first direction 216 and closed in the second direction 218.

The tooth mounting passage 236 includes a counterbore 237 facing in the first direction 216. A plug 239 is configured to close the counterbore 237 to protect the tooth mounting passage 236 from debris.

The biasing spring 208 is configured to be received around the mounting shaft 204 and to engage the spring supporting surface 222 of the receiver 202. The biasing spring 208 biases the mounting shaft 204 in the second direction 218 when the mounting shaft 204, the tooth 206 and the biasing spring 208 are assembled together on the receiver 202. Washers 268 and 270 may be received between the inner end of the spring 208 and the spring supporting surface 222.

A retaining plate 244 is attached to the receiver 202 by a plurality of bolts 246 and partially blocks one end of the receiver mounting passage 212 to retain the mounting shaft 204 and the biasing spring 208 in the receiver mounting passage 212. The bolts 246 may be received in threaded bores 207 formed in the receiver 202. The retaining plate 244 includes a bore 248 therethrough. The actuating end 226 of the mounting shaft 204 protrudes through the bore 248 out of the receiver mounting passage 212.

The receiver mounting passage 212 includes a central bore portion 250 having a keyway 252 configured such that the key 228 of the tooth mounting end 224 of the mounting shaft 204 may pass through the keyway 252 as the mounting shaft 204 is inserted in the first direction 216 through the central bore portion 250. The receiver mounting passage 212 further includes a counterbore 254 adjacent one end of the central bore portion 250 such that the spring supporting surface 222 is defined as a shoulder 222 joining the central bore portion 250 and the counterbore 254. The receiver mounting passage 212 includes a further counterbore 256 adjacent another end of the central bore portion 250. The shank 234 of the tooth 206 may be a cylindrical shank 234 received in the further counterbore 256 of the receiver mounting passage 212. Alternatively the shank 234 could have a four-sided cross-section and instead of the cylindrical counterbore 256 the receiver mounting passage may have a corresponding four-sided cross-section for closely receiving the shank 234.

The tooth 206 includes a four sided cutting body 258 extending in the first direction 216 from the shank 234. The four sided cutting body 258 defines a tooth shoulder 260 joining the cylindrical shank 234 to the four sided cutting body 258. The tooth shoulder 260 engages the tooth supporting surface 220 of the receiver 202 when the mounting shaft 204, the tooth 206 and the biasing spring 208 are assembled together on the receiver 202. The at least one cutting surface 232 may include four cutting points located at corners of the four sided body 258. Opposed sides of the four sided body 258 may flare away from each other in the first direction 216.

The tooth shoulder 260 of the four sided cutting body 258 may also be described as a flat bottom 260 defining a tooth support surface configured to rest on the tooth supporting surface 220 of the receiver 202. The body 258 includes the at least one cutting surface 232 spaced in the first direction 216 from the flat bottom 260. The shank 234 extends from the flat bottom 260 in the second direction 218 opposite the first direction 216.

Figure 5:
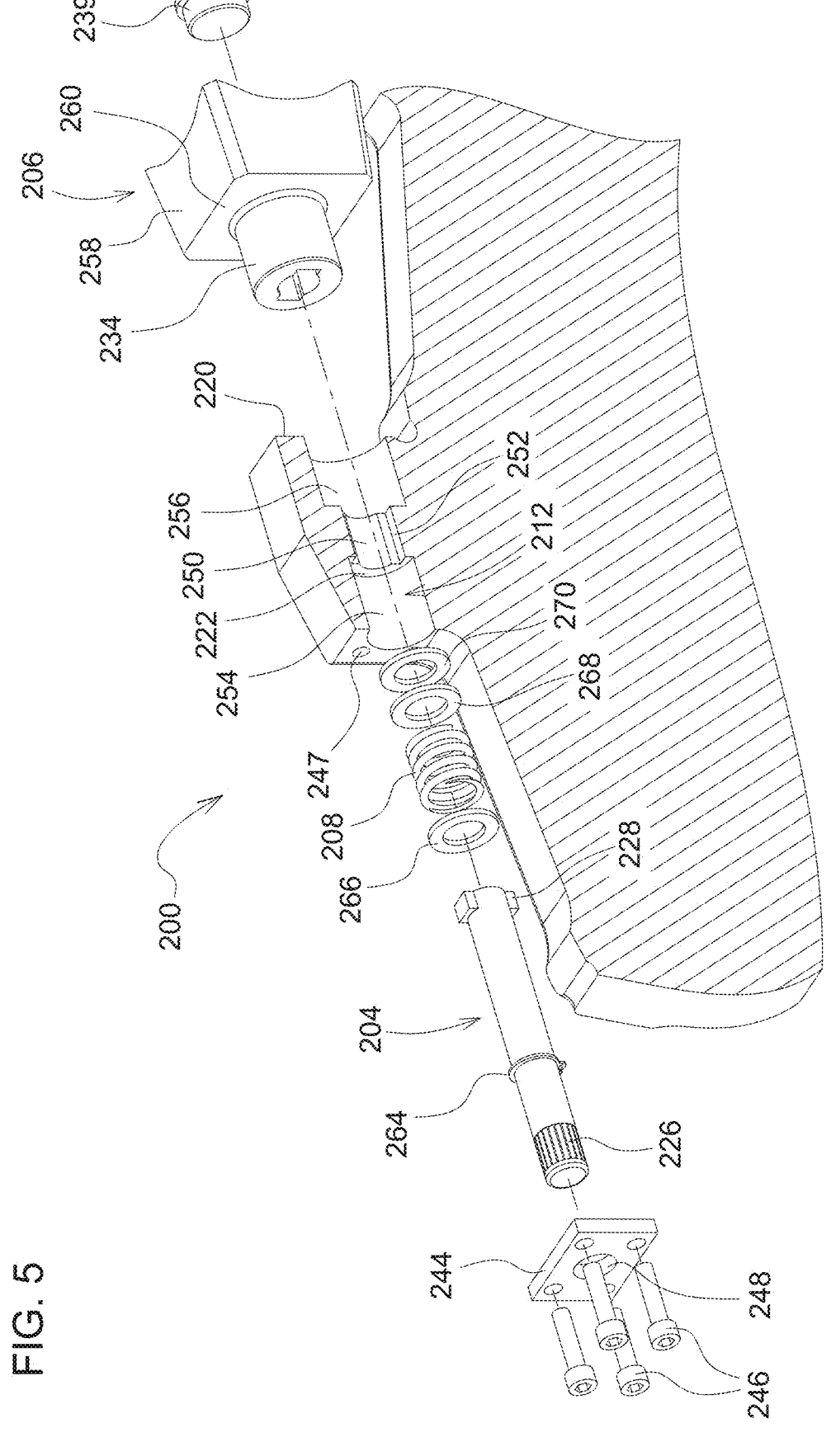
FIG. 5 is an exploded perspective cross-sectional view of the cutting assembly of FIG. 3.
Figure 6:
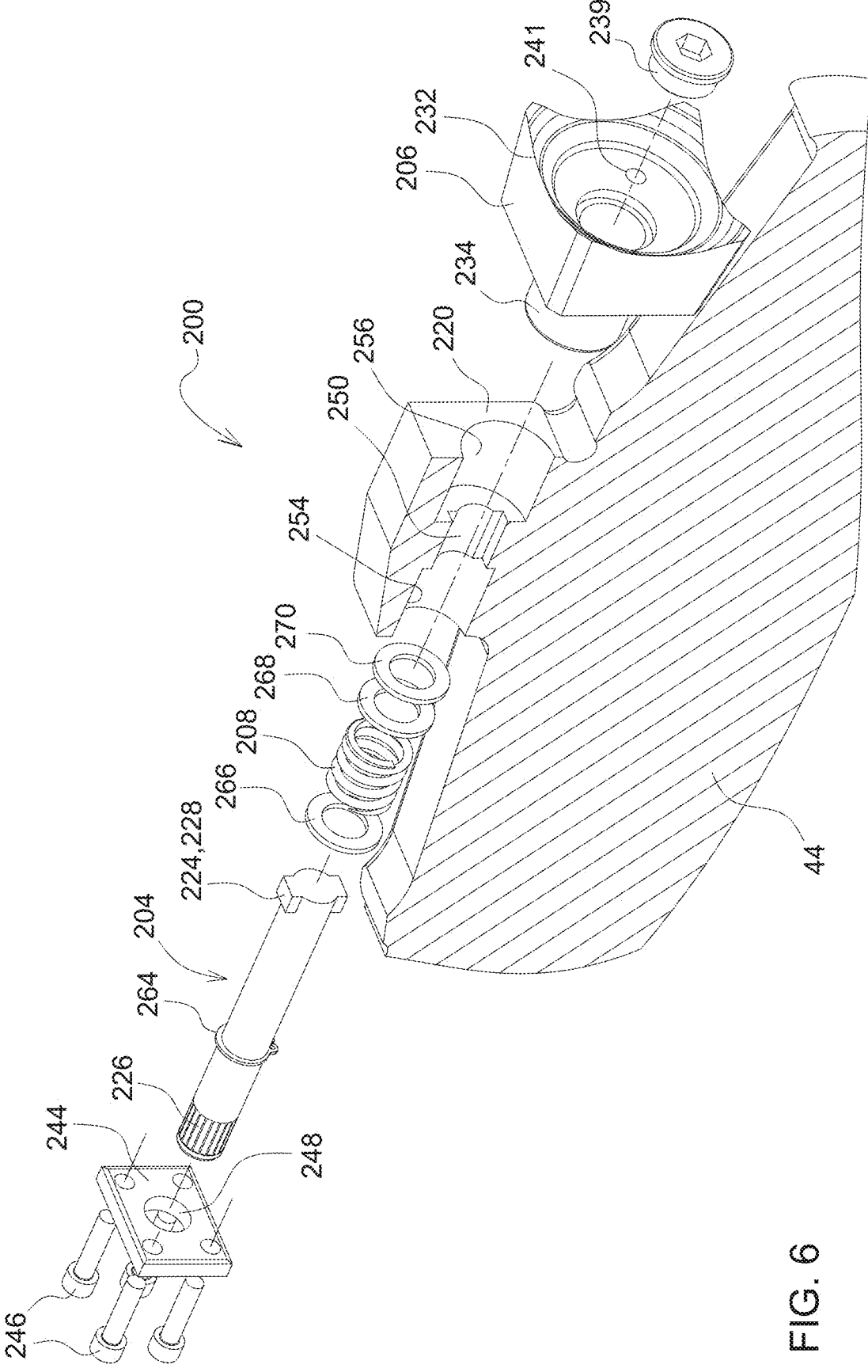
FIG. 6 is another exploded perspective cross-sectional view of the cutting assembly of FIG. 3 viewed from a different perspective.
Figure 7:
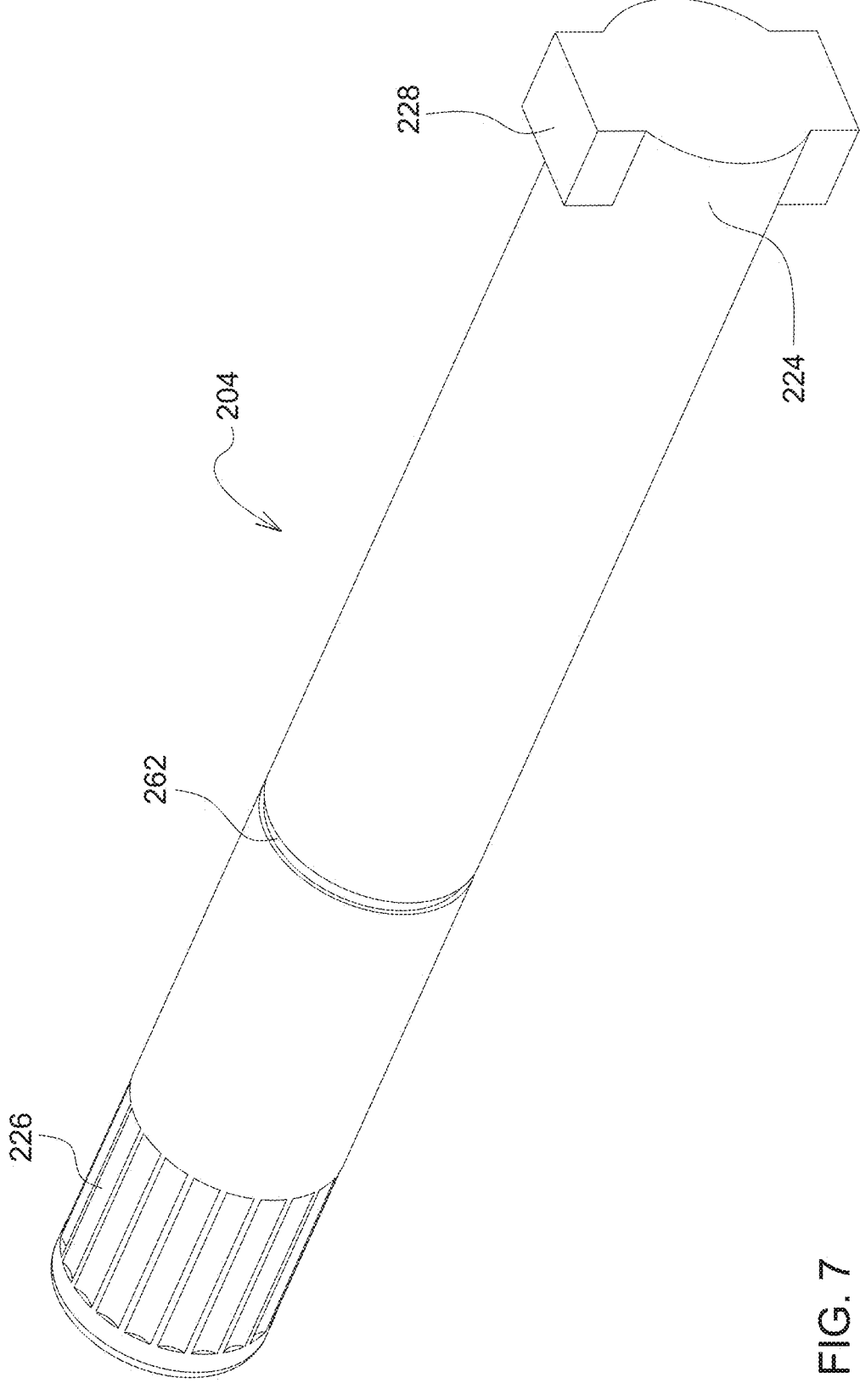
FIG. 7 is a perspective view of the mounting shaft of the cutting assembly of FIG. 3.
Figure 8:
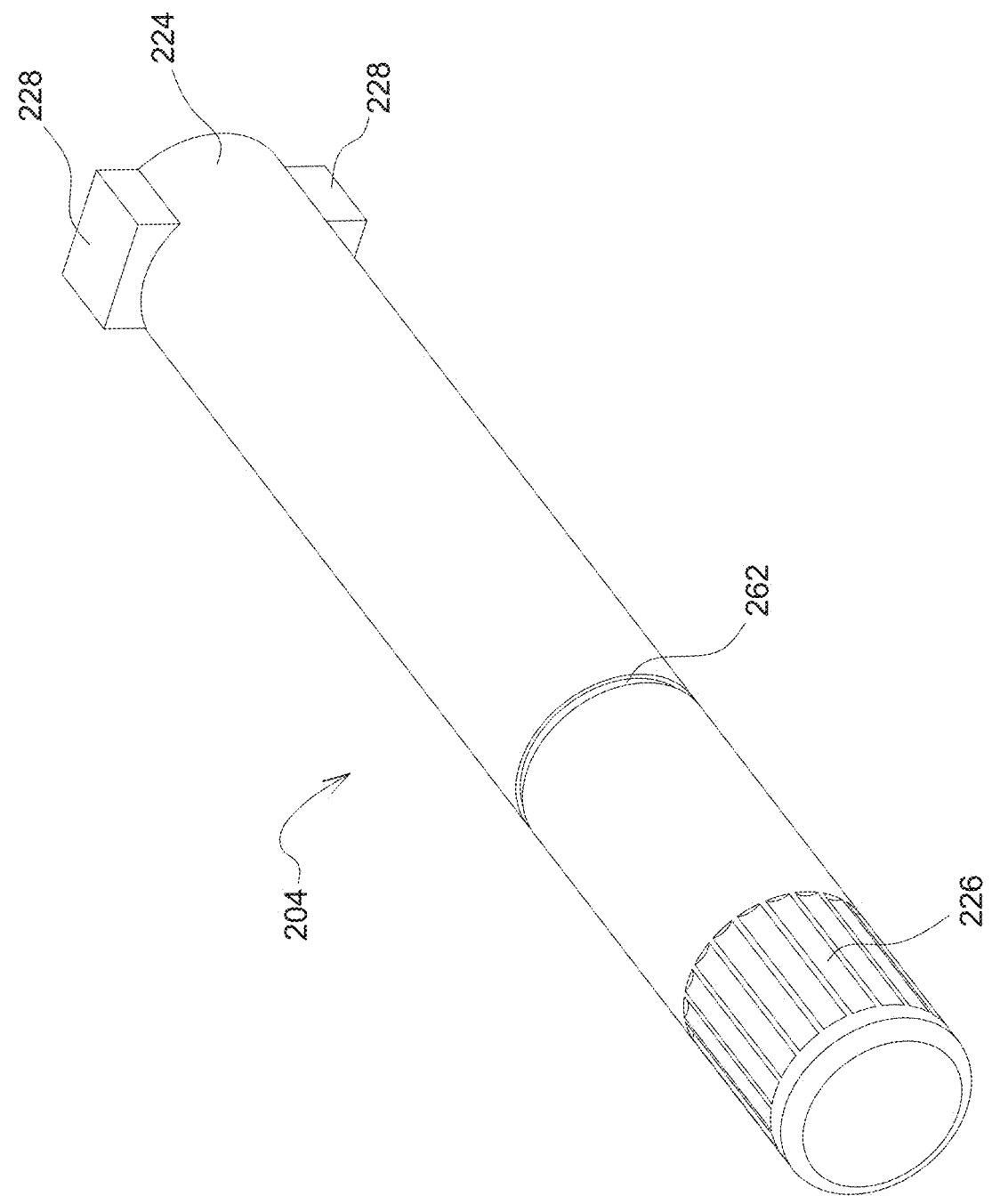
FIG. 8 is another perspective view of the mounting shaft of the cutting assembly of FIG. 3 from a different perspective.

Further details of the cutting assembly 200 are seen in the exploded view of FIG. 5. The mounting shaft 204 has an annular groove 262 formed therein as best seen in FIG. 7. An expandable resilient keeper ring or stop structure 264 is retained in groove 262 and extends radially outward and functions as a spring stop 264 to stop movement of one end of the biasing spring 208 toward the actuating end 226. A first washer 266 may be received between the outer end of spring 208 and the spring stop 264. Second and third washers 268 and 270 may be received about the mounting shaft 204 between the inner end of spring 208 and the spring supporting surface 222.

Methods of Assembly and Replacement:

The cutting assembly 200 described above allows a human operator to install new cutting teeth 206, or remove, reorient and replace a partially worn cutting tooth 206 quickly and easily without the use of any tools.

A method of installing the quick attach tooth assembly 200 on the receiver 202 may includes steps of:

assembling the mounting shaft 204 with the biasing spring 208 received around the mounting shaft 204, one end of the biasing spring 208 being stopped from movement toward the actuating end 226 by the spring stop 264 extending radially outward from the mounting shaft 204, the tooth mounting end 224 of the mounting shaft 204 including the key 228 extending radially outward from the mounting shaft 204;

inserting the tooth mounting end 224 of the mounting shaft into the receiver mounting passage 212 of the receiver 202 so that the actuating end 226 of the mounting shaft 204 still protrudes out of the receiver mounting passage 212;

fitting the retaining plate 244 over the actuating end 224 of the mounting shaft 204 so that the actuating end 224 of the mounting shaft 204 protrudes through the opening 248 of the retaining plate 244;

attaching the retaining plate 244 to the receiver 202, such as with the bolts 246, to hold the mounting shaft 204 and the spring 208 within the receiver mounting passage 212;

inserting the shank 234 of the quick attach tooth 206 into an end of the receiver mounting passage 212 opposite from the actuating end 226 of the mounting shaft 204, the shank 234 having the tooth mounting passage 236 defined therethrough, the tooth mounting passage 236 including the insertion path 238 and the blind return path or passage 240;

aligning the key 228 of the tooth mounting end 224 of the mounting shaft 204 with the insertion path 238 of the tooth 206;

inserting the key 228 through the insertion path 238;

rotating the mounting shaft 204 relative to the tooth 206 so that the key 228 is aligned with the blind return path 240; and releasing the mounting shaft 204 so that the biasing spring 208 retracts the mounting shaft 204 so that the key 228 engages the blind end 242 of the blind return path 240 thereby holding the tooth 206 in place against the tooth supporting surface 220 of the receiver 202.

The step of inserting the key 228 through the insertion path 238 may include compressing the biasing spring 208.

The method may further include removing the tooth 206 by pushing the mounting shaft 204 inward to compress the biasing spring 208 and then rotating the mounting shaft 204 relative to the tooth 206 to align the key 228 with the insertion path 238, then sliding the tooth 206 out of the receiver mounting passage 212 and out of engagement with the mounting shaft 204. The method may then further include rotating the tooth 206 to reorient the cutting surface 232 of the tooth 206 and the reassembling the reoriented tooth 206 with the receiver 202. In this manner the human operator of the apparatus may quickly and easily remove, reorient and replace the four side cutting teeth 206 without the use of any tools.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A cutting assembly, comprising:

a receiver including at least one tooth mounting location defined on the receiver, each tooth mounting location including a receiver mounting passage disposed through the receiver, the receiver mounting passage having a longitudinal axis defining a first direction and an opposite second direction along the longitudinal axis, and each tooth mounting location including a tooth supporting surface facing at least partially in the first direction and a spring supporting surface facing at least partially in the second direction;

a mounting shaft including a tooth mounting end and an actuating end, the tooth mounting end including a key protruding laterally relative to a longitudinal axis of the mounting shaft, the mounting shaft being configured to be received through the receiver mounting passage;

a tooth configured to be supported on the tooth supporting surface of the receiver, the tooth including at least one cutting surface, the tooth including a shank including a tooth mounting passage defined therethrough, the tooth mounting passage including an insertion path configured such that the key of the tooth mounting end of the mounting shaft may pass through the insertion path, and the tooth mounting passage including a blind return passage rotationally offset from the insertion path about a longitudinal axis of the tooth mounting passage, the blind return passage being configured to block retraction of the mounting shaft from the tooth mounting passage in the second direction when the key is aligned with the blind return passage; and a biasing spring configured to be received around the mounting shaft and to engage the spring supporting surface of the receiver, the biasing spring biasing the mounting shaft in the second direction when the mounting shaft, the tooth and the biasing spring are assembled together on the receiver;

wherein the insertion path and the blind return passage of the tooth mounting passage form a J-slot configured such that to release the tooth from the assembly the mounting shaft must move in the first direction relative to the receiver compressing the spring, and then the mounting shaft must be rotated about the longitudinal axis to move the key into the insertion path so that the tooth may be removed from the assembly by movement of the tooth in the first direction relative to the receiver.

2. The cutting assembly of claim 1, further comprising:

a retaining plate attached to the receiver and partially blocking one end of the receiver mounting passage to retain the mounting shaft and the biasing spring in the receiver mounting passage, the retaining plate including a bore therethrough, the actuating end of the mounting shaft protruding through the bore out of the receiver mounting passage.

3. The cutting assembly of claim 1, wherein:

the receiver mounting passage includes a central bore portion having a keyway configured such that the key of the tooth mounting end of the mounting shaft may pass through the keyway as the mounting shaft is inserted in the first direction through the central bore portion, and a counterbore adjacent one end of the central bore portion such that the spring supporting surface is defined as a shoulder joining the central bore portion and the counterbore.

4. The cutting assembly of claim 3, wherein:

the receiver mounting passage includes a further counterbore adjacent another end of the central bore portion; and the shank of the tooth is a cylindrical shank received in the further counterbore of the receiver mounting passage.

5. The cutting assembly of claim 4, wherein:

the tooth includes a four sided cutting body extending in the first direction from the shank, the four sided cutting body defining a tooth shoulder joining the cylindrical shank to the four sided cutting body, the tooth shoulder engaging the tooth supporting surface of the receiver when the mounting shaft, the tooth and the biasing spring are assembled together on the receiver.

6. The cutting assembly of claim 1, wherein:

the tooth mounting passage includes a counterbore facing in the first direction; and the cutting assembly further includes a plug configured to close the counterbore to protect the tooth mounting passage from debris.

7. A cutting assembly, comprising:

a receiver including at least one tooth mounting location defined on the receiver, each tooth mounting location including a receiver mounting passage disposed through the receiver, the receiver mounting passage having a longitudinal axis defining a first direction and an opposite second direction along the longitudinal axis, and each tooth mounting location including a tooth supporting surface facing at least partially in the first direction and a spring supporting surface facing at least partially in the second direction;

a mounting shaft including a tooth mounting end and an actuating end, the tooth mounting end including a key protruding laterally relative to a longitudinal axis of the mounting shaft, the mounting shaft being configured to be received through the receiver mounting passage;

a tooth configured to be supported on the tooth supporting surface of the receiver, the tooth including at least one cutting surface, the tooth including a shank including a tooth mounting passage defined therethrough, the tooth mounting passage including an insertion path configured such that the key of the tooth mounting end of the mounting shaft may pass through the insertion path, and the tooth mounting passage including a blind return passage rotationally offset from the insertion path about a longitudinal axis of the tooth mounting passage, the blind return passage being configured to block retraction of the mounting shaft from the tooth mounting passage in the second direction when the key is aligned with the blind return passage; and a biasing spring configured to be received around the mounting shaft and to engage the spring supporting surface of the receiver, the biasing spring biasing the mounting shaft in the second direction when the mounting shaft, the tooth and the biasing spring are assembled together on the receiver;

wherein the receiver is located on a rotatable cutting disk of a circular saw of a tree felling head.

8. A cutting assembly, comprising:

a receiver including at least one tooth mounting location defined on the receiver, each tooth mounting location including a receiver mounting passage disposed through the receiver, the receiver mounting passage having a longitudinal axis defining a first direction and an opposite second direction along the longitudinal axis, and each tooth mounting location including a tooth supporting surface facing at least partially in the first direction and a spring supporting surface facing at least partially in the second direction;

a mounting shaft including a tooth mounting end and an actuating end, the tooth mounting end including a key protruding laterally relative to a longitudinal axis of the mounting shaft, the mounting shaft being configured to be received through the receiver mounting passage;

a tooth configured to be supported on the tooth supporting surface of the receiver, the tooth including at least one cutting surface, the tooth including a shank including a tooth mounting passage defined therethrough, the tooth mounting passage including an insertion path configured such that the key of the tooth mounting end of the mounting shaft may pass through the insertion path, and the tooth mounting passage including a blind return passage rotationally offset from the insertion path about a longitudinal axis of the tooth mounting passage, the blind return passage being configured to block retraction of the mounting shaft from the tooth mounting passage in the second direction when the key is aligned with the blind return passage; and a biasing spring configured to be received around the mounting shaft and to engage the spring supporting surface of the receiver, the biasing spring biasing the mounting shaft in the second direction when the mounting shaft, the tooth and the biasing spring are assembled together on the receiver;

wherein the receiver is located on a rotatable drum of a mulcher.

*     *     *     *     *